United States Patent
Corda et al.

(10) Patent No.: US 9,608,989 B2
(45) Date of Patent: Mar. 28, 2017

(54) METHOD, SYSTEM, TRUSTED SERVICE MANAGER, SERVICE PROVIDER AND MEMORY ELEMENT FOR MANAGING ACCESS RIGHTS FOR TRUSTED APPLICATIONS

(75) Inventors: Alexandre Corda, Nice (FR); Luis Bobo, Antibes (FR); Jonathan Azoulai, Sophia Antipolis (FR)

(73) Assignee: NXP B.V., Eindhoven (NL)

( * ) Notice: Subject to any disclaimer, the term of this patent is extended or adjusted under 35 U.S.C. 154(b) by 1539 days.

(21) Appl. No.: 12/679,874

(22) PCT Filed: Sep. 22, 2008

(86) PCT No.: PCT/IB2008/053831
§ 371 (c)(1),
(2), (4) Date: Mar. 24, 2010

(87) PCT Pub. No.: WO2009/040715
PCT Pub. Date: Apr. 2, 2009

(65) Prior Publication Data
US 2010/0205432 A1 Aug. 12, 2010

(30) Foreign Application Priority Data
Sep. 27, 2007 (EP) .................................... 07291159

(51) Int. Cl.
*G06F 21/33* (2013.01)
*G06F 21/62* (2013.01)
(Continued)

(52) U.S. Cl.
CPC ........ *H04L 63/0853* (2013.01); *G06F 21/335* (2013.01); *G06F 21/35* (2013.01); *G06F 21/629* (2013.01); *G06Q 20/3278* (2013.01)

(58) Field of Classification Search
CPC ... H04L 63/0853; G06F 21/335; G06F 21/35; G06F 21/629; G06Q 20/3278
(Continued)

(56) References Cited

U.S. PATENT DOCUMENTS 5,689,638 A 11/1997 Sadovsky
6,931,379 B1 * 8/2005 Sato et al. ...................... 705/50
(Continued)

FOREIGN PATENT DOCUMENTS

CN 1745557 A 3/2006
EP 1798867 A2 6/2007
(Continued)

OTHER PUBLICATIONS

GSM "White Paper Mobile NFC" Feb. 2007.
Mobile NFC Services, Version 1.0, Feb. 200, pp. 1-21.

*Primary Examiner* — Michael Pyzocha

(57) ABSTRACT

A method for granting trusted applications (SP1_WL) of a Service Provider (SP1, SP2)access to applications (appSP1.1, appSP1.2; appSP2.1) of that Service Provider (SP1, SP2) that have been stored in a secure element (SE) comprises: the Service Provider (SP1, SP2) transmits a request (REQ1) for granting access to its applications to a Trusted Service Manager (TSM); the Trusted Service Manager (TSM) generates an access right code (AC1) and transmits it to both the Service Provider (SP1, SP2) and a service manager (SM) in the secure element (SE); the Service Provider (SP1, SP2) generates the trusted application (SP1_WL), provides it with the access right code (AC1) and sends it to the secure element (SE); the trusted application (SP1_WL) connects to the service manager (SM) with the access right code (AC1) whereupon the service manager (SM) grants the wallet (SP1_WL) access to the applications (appSP1.1, appSP1.2; appSP2.1).

16 Claims, 2 Drawing Sheets

(51) Int. Cl.
*G06F 21/35* (2013.01)
*H04L 29/06* (2006.01)
*G06Q 20/32* (2012.01)

(58) Field of Classification Search
USPC ....... 713/150, 159, 172–174; 726/2–3, 5, 27
See application file for complete search history.

(56) References Cited

U.S. PATENT DOCUMENTS

| | | | |
|---|---|---|---|
| 7,571,461 B2* | 8/2009 | Kwok et al. | 726/2 |
| 8,095,977 B2* | 1/2012 | Mullor et al. | 726/20 |
| 8,120,460 B1* | 2/2012 | Zhu | 340/5.73 |
| 8,140,409 B2* | 3/2012 | Takayama | 705/27.1 |
| 8,249,654 B1* | 8/2012 | Zhu | 455/558 |
| 8,285,329 B1* | 10/2012 | Zhu | 455/558 |
| 2002/0147924 A1* | 10/2002 | Flyntz | 713/200 |
| 2002/0150253 A1 | 10/2002 | Brezak et al. | |
| 2003/0018913 A1 | 1/2003 | Brezak et al. | |
| 2003/0231103 A1* | 12/2003 | Fisher | 340/5.73 |
| 2004/0250077 A1* | 12/2004 | Jang et al. | 713/175 |
| 2005/0050366 A1* | 3/2005 | Kwok et al. | 713/202 |
| 2005/0165915 A1* | 7/2005 | Hejna, Jr. | 709/219 |
| 2006/0271979 A1* | 11/2006 | Hejna, Jr. | 725/89 |
| 2008/0010456 A1 | 1/2008 | Seif | |
| 2008/0208741 A1* | 8/2008 | Arthur et al. | 705/41 |
| 2009/0055284 A1* | 2/2009 | Takayama | 705/26 |
| 2009/0307139 A1* | 12/2009 | Mardikar et al. | 705/67 |
| 2011/0004873 A1* | 1/2011 | Park et al. | 717/174 |
| 2016/0335618 A1* | 11/2016 | Koh | G06Q 20/206 |

FOREIGN PATENT DOCUMENTS

| | | | |
|---|---|---|---|
| JP | 08-263417 | | 10/1996 |
| JP | 2003030150 A | | 1/2003 |
| JP | 2003099401 A | | 4/2003 |
| JP | 2005-018749 A | | 1/2005 |
| KR | 10-2007-006191 | * | 7/2007 |
| WO | 2006056802 A1 | | 6/2006 |

* cited by examiner

METHOD, SYSTEM, TRUSTED SERVICE MANAGER, SERVICE PROVIDER AND MEMORY ELEMENT FOR MANAGING ACCESS RIGHTS FOR TRUSTED APPLICATIONS

FIELD OF THE INVENTION

The invention relates to a method for granting a trusted application of a Service Provider access to applications of that Service Provider, which applications have been stored in a secure element such as a SmartMX device.

The invention further relates to a telecommunication system comprising at least one Service Provider, at least one Trusted Service Manager and a plurality of mobile communication devices, e.g. NFC mobile phones, being equipped with secure elements to store applications of the Service Providers.

The invention further relates to a Trusted Service Manager.

The invention further relates to a Service Provider.

The invention further relates to a service manager computer program product being directly loadable into a secure element with an arithmetic-logic unit and a memory.

The invention further relates to a secure element being adapted to process the service manager computer program product mentioned.

BACKGROUND OF THE INVENTION

There are mobile communication devices known which contain memory devices having unique memory device identifications, e.g. the MIFARE® classic family, developed by NXP Semiconductors, a contactless smart card IC operating in the 13.56 MHz frequency range with read/write capability. Recently, secure elements have been developed which are memory devices providing enhanced security features, particularly for the use in mobile phones and other mobile communication devices with Near Field Communication (NFC) capabilities. Said secure elements are also known as "Smard Cards". For a better understanding a SmartMX device which is a leading representative of the secure elements will now be explained. SmartMX (Memory eXtension) is a family of smart cards that have been designed by NXP Semiconductors for high-security smart card applications requiring highly reliable solutions, with or without multiple interface options. Key applications are e-government, banking/finance, mobile communications and advanced public transportation.

SmartMX architecture combines coprocessors for RSA, ECC, DES and AES and enables implementation of operating systems including Java Open Platform and MULTOS. The ability of SmartMX cards to run the MIFARE protocol concurrently with other contactless transmission protocols implemented by the User Operating System enables the combination of new services and existing applications based on MIFARE (e.g. ticketing) on a single Dual Interface controller based smart card. SmartMX cards are able to emulate MIFARE Classic devices and thereby makes this interface compatible with any installed MIFARE Classic infrastructure. The contactless interface can be used to communicate via any protocol, particularly the MIFARE protocol and self defined contactless transmission protocols. SmartMX enables the easy implementation of state-of-the-art operating systems and open platform solutions including JCOP (the Java Card Operating System) and offers an optimized feature set together with the highest levels of security. SmartMX incorporates a range of security features to counter measure side channel attacks like DPA, SPA etc. A true anticollision method (acc. ISO/IEC 14443-3), enables multiple cards to be handled simultaneously.

In February 2007 the GSM Assocation (GSMA) published a white paper outlining operator community guidance for the eco-system parties involved in the development of Mobile NFC (Near Field Communication) services. Mobile NFC is defined as the combination of contactless services with mobile telephony, based on NFC technology. The mobile phone with a hardware-based secure identity token (the UICC) can provide the ideal environment for NFC applications. The UICC can replace the physical card thus optimising costs for the Service Provider, and offering users a more convenient service. Various different entities are involved in the Mobile NFC ecosystem. These are defined below:

Customer—uses the mobile device for mobile communications and Mobile NFC services. The customer subscribes to an MNO and uses Mobile NFC services.

Mobile Network Operator (MNO)—provides the full range mobile services to the Customer, particularly provides UICC and NFC terminals plus Over The Air (OTA) transport services.

Service Provider (SP)—provides contactless services to the Customer (SPs are e.g. banks, public transport companies, loyalty programs owners etc.).

Retailer/Merchant—service dependent, e.g. operates a NFC capable Point of Sales (POS) terminal.

Trusted Service Manager (TSM)—securely distributes and manages the Service Providers' services to the MNO customer base.

Handset, NFC Chipset and UICC Manufacturer—produce Mobile NFC/Communication devices and the associated UICC hardware.

Reader Manufacturer—produces NFC reader devices.

Application developer—designs and develops the Mobile NFC applications.

Standardisation Bodies and Industry Fora—develop a global standard for NFC, enabling interoperability, backward compatibility and future development of NFC applications and services.

One of the key findings in said white paper is that Mobile NFC will be successful provided that the Mobile NFC ecosystem is steady, providing value for all entities within it; and is efficient, by introducing a new role of the Trusted Service Manager.

The role of the Trusted Service Manager (TSM) is to:

Provide the single point of contact for the Service Providers to access their customer base through the MNOs.

Manage the secure download and life-cycle management of the Mobile NFC application on behalf of the Service Providers.

The TSM does not participate in the transaction stage of the service, thus ensuring that the Service Providers' existing business models are not disrupted. Depending on the national market needs and situations, the TSM can be managed by one MNO, a consortium of MNOs, or by independent Trusted Third Parties. The number of operating TSMs in one market will depend on the national market needs and circumstances.

A characteristic feature of secure elements such as SmartMX cards is that they comprise a service manager which is a program that controls the installation of applications and services within the secure element and hinders installed applications to gain access to other installed applications and services. The service manager cooperates with an external Trusted Service Manager. The installed applications and services are provided by Service Providers, installation requires the use of the Trusted Service Manager as a proxy to hinder any abuse by Service Providers. While the ability of the secure element's service manager to hinder the installed applications to gain access to other installed applications and services is important and necessary from a point of security, it nevertheless confines the development of new NFC services. The confinement caused by said behaviour of the service manager in the secure element becomes striking when considering the situation when a Service Provider wants to provide his own trusted application (also know as Wallet or Trusted MIDlet) for his NFC applications (coupons, tickets, . . . ) already installed in the secure element of a mobile communication device with NFC capabilities. Generally, trusted applications should be permitted to use application program interfaces that are considered sensitive and are restricted, e.g. to access applications stored in the secure element. What will happen in this situation is that the trusted application can not get access to the NFC applications located in the secure element, since the service manager must not allow this, because several Service Providers can have installed their own NFC applications in the same secure element and one Service Provider must no not be given access, through its own Wallet, to installed NFC application of other Service Providers.

OBJECT AND SUMMARY OF THE INVENTION

It is an object of the invention to overcome the drawbacks of the known secure elements and to describe a way allowing Service Providers to install a Wallet in a secure element that can gain access to those installed applications and only to those of the same Service Provider without compromising security regarding the installed applications of other Service Providers.

In order to achieve the object defined above, with a method for granting a trusted application access to applications according to the invention characteristic features are provided so that a method according to the invention can be characterized in the way defined below, that is:

A method for granting a trusted application, also known as wallet, of a Service Provider access to applications of that Service Provider which applications have been stored in a secure element such as a SmartMX device, wherein the secure element comprises a service manager that generally hinders access of wallets to stored applications, comprising:

at the Service Provider, transmitting a request to a Trusted Service Manager which controls the service manager in the secure element for granting the Service Provider access to its applications;

at the Trusted Service Manager, generating an access right code and transmitting it to both the Service Provider and the service manager in the secure element;

at the Service Provider, generating the wallet, providing it with the access right code and sending it to the secure element;

wherein the wallet, when intending to access the applications of its Service Provider in the secure element connects to the service manager with the access right code whereupon the service manager grants the wallet access to the applications of its Service Provider.

In order to achieve the object defined above, with a telecommunication system according to the invention characteristic features are provided so that a system according to the invention can be characterized in the way defined below, that is:

A telecommunication system comprising at least one Service Provider, at least one Trusted Service Manager and a plurality of mobile communication devices, e.g. NFC mobile phones, being equipped with secure elements to store applications of the Service Providers for granting a trusted application, also known as wallet, of a Service Provider access to applications of that Service Provider, wherein the secure element comprises a service manager, wherein the Service Providers, the Trusted Service Manager, the mobile communication devices and the secure element comprise computing units and software code portions for performing the steps of the above mentioned method.

In order to achieve the object defined above, with a Trusted Service Manager according to the invention characteristic features are provided so that a Trusted Service Manager according to the invention can be characterized in the way defined below, that is:

A Trusted Service Manager being adapted to receive from a Service Provider a request for granting the Service Provider access to its applications stored in a secure element wherein the secure element comprises a service manager that generally hinders access to stored applications, wherein the Trusted Service Manager is adapted to generate an access right code and to transmit it to both the Service Provider and the service manager in the secure element.

In order to achieve the object defined above, with a Service Provider according to the invention characteristic features are provided so that a Service Provider according to the invention can be characterized in the way defined below, that is:

A Service Provider being adapted to store applications in a secure element such as a SmartMX device that is arranged in a mobile communication device, wherein the Service Provider is further adapted to transmit a request for granting access to its applications in the secure element to a Trusted Service Manager, to receive an access right code from the Trusted Service Manager, to generate a trusted application, also known as wallet, to provide it with the access right code and to send it to the secure element.

In order to achieve the object defined above, with a service manager computer program according to the invention characteristic features are provided so that a service manager computer program according to the invention can be characterized in the way defined below, that is:

A service manager computer program product being directly loadable into a secure element with an arithmetic-logic unit and a memory, wherein the service manager computer program product comprises software code portions for performing—when running on the secure element—the steps of receiving and storing an access right code, connecting to a wallet that is installed in the secure element, receiving from the wallet an access right code and comparing it to the stored access right code, and if the access right codes match granting the wallet access to applications installed in the secure element which are comprised by the access right code.

In order to achieve the object defined above, a secure element according to the invention, preferably a SmartMX device, comprises an arithmetic-logic unit and a memory and processes the service manager computer program product when loaded in the secure element.

The characteristic features according to the invention provide the advantage that Service Providers are enabled to provide trusted applications (wallets or Trusted MIDLets) to their users that are installed in the secure elements, which trusted applications are allowed by the service manager to gain access to applications of their (and only their) Service Providers without compromising security regarding the other service providers. These access rights are given by the Trusted Service Manager which is a highly reliable instance.

In some embodiments of the invention the Service Providers and the Trusted Service Manager communicate with each other via a computer network, such as the Internet, wherein the preferred data transmission protocol is HTTPS. These embodiments provide the advantage that data transmission relies on well-defined and highly accessible network infrastructure and services.

In further embodiments of the invention the Trusted Service Manager and/or the Service Provider communicate with the secure element being arranged in a mobile communication device via an Over-The-Air service of a Mobile Network Operator, wherein the preferred Over-The-Air service is Short Message Service. These embodiments again provide the advantage that data transmission relies on well-defined and highly accessible network infrastructure and services.

The aspects defined above and further aspects of the invention are apparent from the exemplary embodiment to be described hereinafter and are explained with reference to this exemplary embodiment.

BRIEF DESCRIPTION OF THE DRAWINGS

The invention will be described in more detail hereinafter with reference to an exemplary embodiment. However, the invention is not limited to this exemplary embodiment.

DESCRIPTION OF EMBODIMENTS

Figure 1:
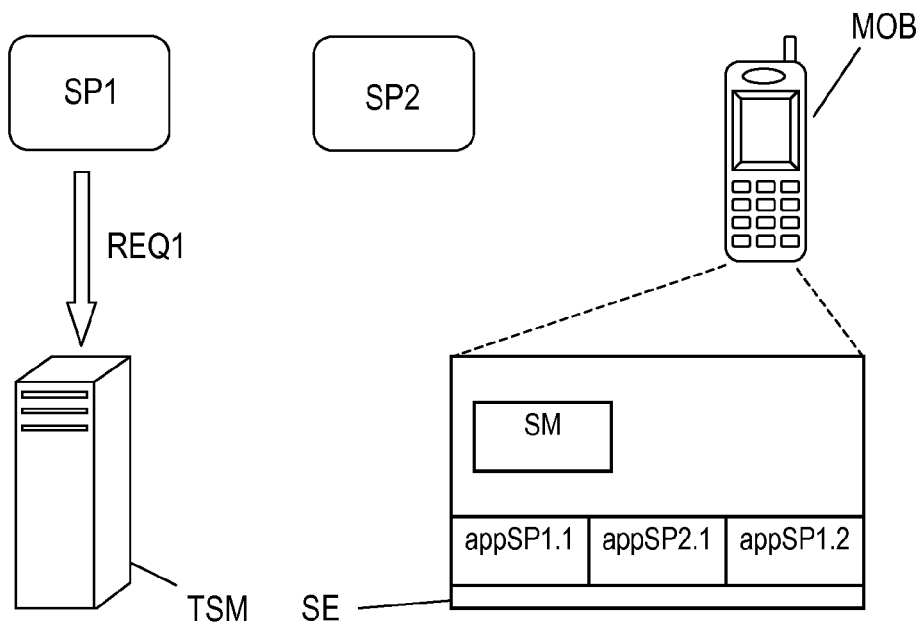
FIG. 1 shows a schematic diagram of a telecommunication system in which context the invention is embedded and a first step of the method according to the present invention.

FIG. 1 shows a schematic diagram of a telecommunication system, e.g. a Mobile NFC ecosystem as disclosed in the above referenced GSMA white book. The system comprises two Service Providers SP1, SP2, a Trusted Service Manager TSM and multiple mobile communications device wherein in the drawing only one mobile communication device MOB is shown. The Service Providers SP1, SP2 communicate with the mobile communication device MOB via the Over-the-Air (OTA) services provided by a Mobile Network Operator, particularly via Short Message Service (SMS) services, and/or via a computer network and wireless services, e.g. NFC services. NFC terminals for carry out NFC services may be provided by the Mobile Network Operator. Similarly, the Trusted Service Manager TSM communicates with the mobile communication device MOB, via an Over-The-Air service of a Mobile Network Operator, e.g. Short Message Service. The Service Providers SP1, SP2 communicate with the Trusted Service Manager TSM via a computer network, such as the Internet, wherein the preferred data transmission protocol is HTTPS.

The mobile communication device MOB may e.g. be configured as a NFC mobile phone. It comprises a secure element SE which is a memory device with enhanced security features that further comprises its own computational power. The secure element SE is advantageously configured as a SmartMX device that may comprise multiple interface options. SmartMX devices also comprise encryption coprocessors and enable implementation of operating systems including Java Operating Systems. The secure element SE comprises a service manager SM that is implemented as a computer program that is configured to manage the installation of NFC applications appSP1.1, appSP1.2, appSP2.1 that have been provided by the Service Providers SP1, SP2. For security reasons the service manager SM blocks access of installed applications to other installed applications. Therefore, even when a Service Provider SP1, SP2 (as in the present example the Service Provider SP1) wants to provide its own trusted application (also known as Wallet or Trusted MIDlet) for its applications (coupons, tickets, other NFC applications, etc.) installed in the secure element SE of the mobile communication device MOB, this trusted application does not have direct access to said applications. In order to overcome this problem the present invention provides the following solution which is based on introducing access rights to the service manager SM. The service manager SM is controlled by the Trusted Service Manager TSM and the Trusted Service Manager TSM is defined as the entity being exclusively entitled to manage these access rights.

In the example of FIG. 1 the Service Provider SP1 has provided the applications appSP1.1 and appSP1.2 (for instance, 2 concert tickets) which have been installed in the secure element SE under control of the service manager SM. Similarly, the Service Provider SP2 has provided the application appSP2.1 to the secure element SE.

The Service Provider SP1 wants to install in the mobile communication device MOB a wallet to allow a user of the mobile communication device MOB to access the applications appSP1.1, appSP1.2 of the Service Provider SP1. In order to achieve this goal the Service Provider SP1 transmits a request REQ1 to the Trusted Service Manager TSM asking for access to its applications appSP1.1, appSP1.2.

Figure 2:
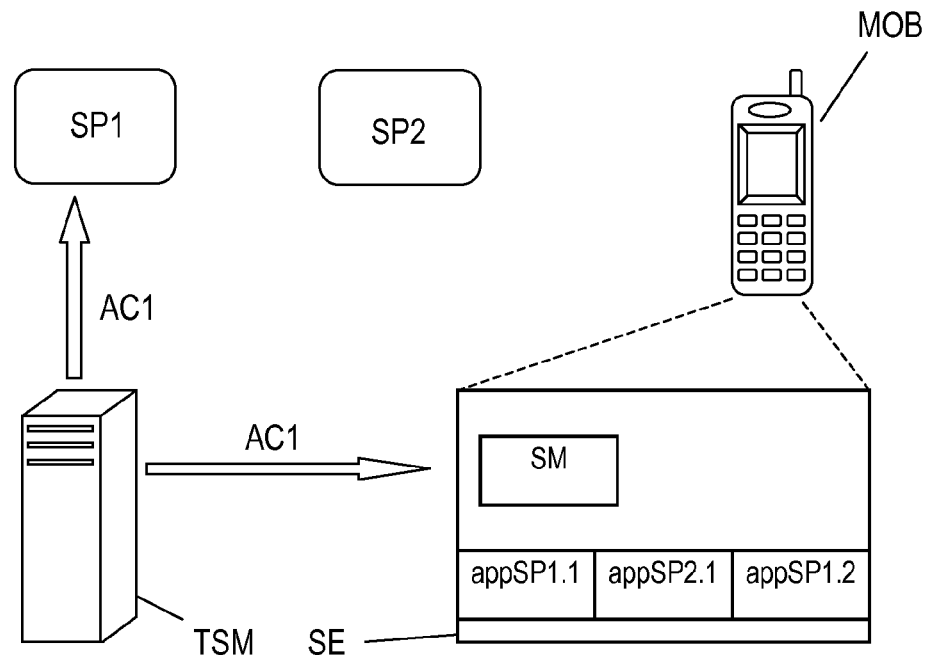
FIG. 2 shows a schematic diagram of the telecommunication system depicting further steps of the method according present invention.

As shown in FIG. 2 the Trusted Service Manager TSM handles this request REQ1 by generating an access right code AC1 and transmits this access right code AC1 to both the Service Provider SP1 and the service manager SM in the secure element SE of the mobile communication device MOB. The access right code AC1 can be represented for example by a pin code.

Figure 3:
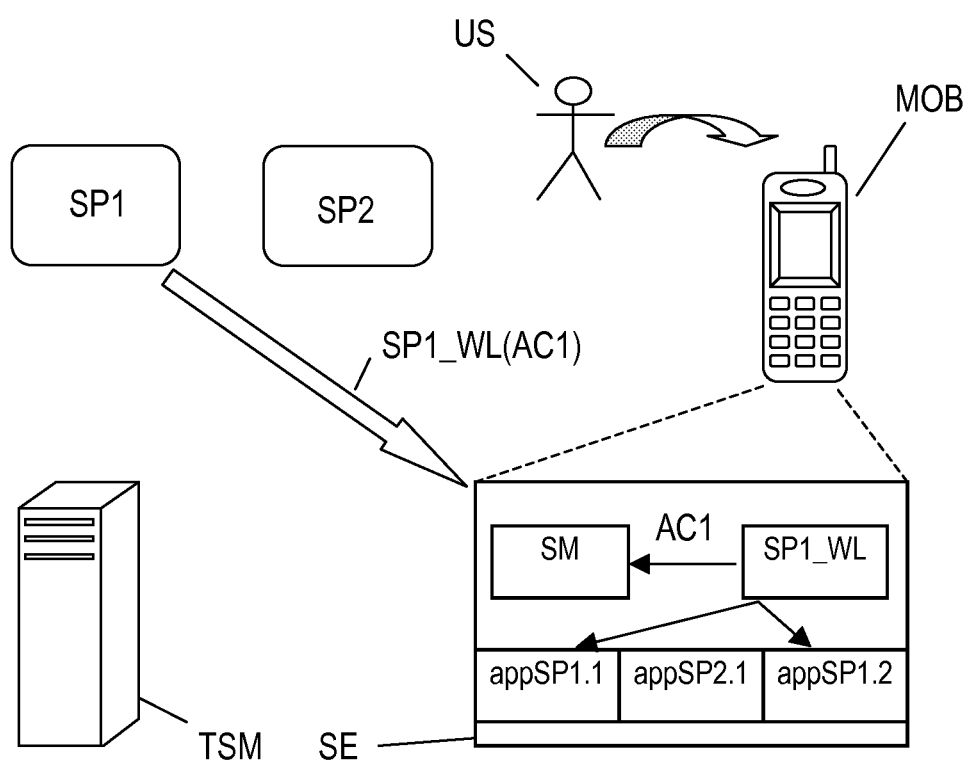
FIG. 3 shows a schematic diagram of the telecommunication system depicting the remaining steps of the method according present invention.

Having received the access right code AC1 the Service Provider SP1 generates the wallet SP1_WL by providing it with its access right code AC1 and sends it to the secure element SE, see arrow SP1_WL(AC1) in FIG. 3. The service manager SM manages installation of the wallet SP1_WL in the secure element SE. When the user US of the mobile telecommunication device MOB starts the wallet SP1_WL in order to access the applications appSP1.1 and appSP1.2 of the Service Provider SP1 the wallet SP1 WL connects to the service manager SM with the access right code AC1, i.e. with the granted access rights of the Service Provider SP1. The service manager SM compares the access right code AC1 received by the wallet SP1_WL with the access right code AC1 received by the Trusted Service Manager TSM and since they correspond grants the wallet SP1_WL access to the applications appSP1.1, appSP1.2 of the Service Provider SP1, but not to the application appSP2.1 of the second Service Provider SP2. Thereby, the user US of the mobile communication device MOB gets access to the applications appSP1.1 and appsSP1.2.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The indefinite article "a" or "an" preceding an element does not exclude the presence of a plurality of such elements. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A method for granting a wallet of a Service Provider access to applications of the Service Provider which have been stored in a secure element, wherein the secure element comprises a service manager configured to restrict access of wallets to stored applications, comprising:
    at the Service Provider, transmitting a request to a Trusted Service Manager which controls the service manager in the secure element for granting the Service Provider access to the applications of the Service Provider;
    at the Trusted Service Manager, generating an access right code and transmitting the access right code to both the Service Provider and the service manager in the secure element;
    at the Service Provider, generating the wallet, providing the wallet with the access right code and sending the wallet to the secure element, wherein the wallet, when intending to access the applications of the Service Provider in the secure element connects to the service manager with the access right code whereupon the service manager grants the wallet access to the applications of the Service Provider.

2. The method as claimed in claim 1, wherein the Service Provider and the Trusted Service Manager communicate with each other via a computer network, using HTTPS.

3. The method as claimed in claim 1, wherein at least one of the Trusted Service Manager and the Service Provider communicate with the secure element being arranged in a mobile communication device via an Over-The-Air service of a Mobile Network Operator.

4. A telecommunication system comprising:
    at least one Service Provider;
    at least one Trusted Service Manager; and
    a plurality of mobile communication devices being equipped with secure elements to store applications of the Service Provider, the secure element granting a wallet of the Service Provider access to the applications of the Service Provider, wherein the secure element comprises a service manager, wherein the Trusted Service Manager sends an access right code to the Service Provider and one of the secure elements, wherein the Service Provider comprises a computing unit configured to: transmit a request to a Trusted Service Manager which controls the service manager in the secure element for granting the Service Provider access to the applications of the Service Provider, receive the access right code from the Trusted Service Manager, generate a wallet with the access right code, and send the wallet and the access right code to the secure element.

5. The system as claimed in claim 4, wherein the Service Provider and the Trusted Service Manager communicate with each other via a computer network using HTTPS.

6. The system as claimed in claim 4, wherein at least one of the Trusted Service Manager and the Service Provider communicate with the secure element (SE) arranged in a mobile communication device via an Over-The-Air service of a Mobile Network Operator using a Short Message Service.

7. The system as claimed in claim 4, wherein the secure element is a SmartMX device.

8. A Trusted Service Manager comprising:
    a computing unit being adapted to receive from a Service Provider a request for granting the Service Provider access to applications of the Service Provider stored in a secure element, wherein the secure element comprises a service manager that hinders access to stored applications, wherein the Trusted Service Manager is adapted to generate an access right code and to transmit the access right code to both the Service Provider and the service manager in the secure element.

9. The Trusted Service Manager as claimed in claim 8, wherein the Trusted Service Manager communicates with the Service Provider via a computer network, using HTTPS.

10. The Trusted Service Manager as claimed in claim 8, wherein the Trusted Service Manager communicates with the secure element arranged in the mobile communication device via an Over-The-Air service of a Mobile Network Operator, using Short Message Service.

11. A Service Provider comprising:
    a computing unit being adapted to store applications in a secure element that is arranged in a mobile communication device, wherein the Service Provider is further adapted to transmit a request for granting access to applications of the Service Provider in the secure element to a Trusted Service Manager, to receive an access right code from the Trusted Service Manager, to generate a wallet, to provide it with the access right code, and to send the access right code to the secure element.

12. The Service Provider as claimed in claim 11, wherein the Service Provider communicates with the Trusted Service Manager via a computer network, using HTTPS.

13. The Service Provider as claimed in claim 11, wherein the Service Provider communicates with the secure element arranged in the mobile communication device via an Over-The-Air service of a Mobile Network Operator, using Short Message Service.

14. A secure element comprising an arithmetic-logic unit and a non-transitory memory, the non-transitory memory storing a plurality of applications, the non-transitory memory further comprising instructions for:
    receiving a first access right code from a Trusted Services Manager;
    storing the first access right code in association with a set of the applications, the first access right code restricting access to the set of the applications;
    connecting to a wallet that is installed in the secure element;
    receiving from the wallet a second access right code;
    comparing the second access right code to the stored first access right code; and
    if the access right codes match, granting the wallet access to the set of applications installed in the secure element which are restricted by the first access right code.

15. The secure element according to claim 14, being configured as a SmartMX device.

16. The secure element of claim 14, wherein the wallet is received from a Service Provider.

* * * * *